United States Patent [19]

Head et al.

[11] 4,051,723
[45] Oct. 4, 1977

[54] FORCE-TYPE FLOWMETER

[75] Inventors: Victor P. Head, Hatboro; Peter J. Herzl, Morrisville, both of Pa.

[73] Assignee: Fischer & Porter Co., Warminster, Pa.

[21] Appl. No.: 743,471

[22] Filed: Nov. 19, 1976

Related U.S. Application Data

[62] Division of Ser. No. 626,832, Oct. 29, 1975.

[51] Int. Cl.$^2$ .............................................. G01F 1/28
[52] U.S. Cl. .................................... 73/194 E; 73/228
[58] Field of Search ...................... 73/194 E, 228, 453

[56] References Cited

U.S. PATENT DOCUMENTS

| | | | |
|---|---|---|---|
| 3,605,741 | 9/1971 | Spencer | 73/194 |
| 3,847,020 | 11/1974 | Jurschack | 73/228 |
| 4,003,255 | 1/1977 | Spencer | 73/19 X |

Primary Examiner—Herbert Goldstein

[57] ABSTRACT

A flowmeter capable of accurately measuring and transmitting extremely low flow rates, the meter including a vertically-positioned flow tube having a ferromagnetic ball therein which is subjected to the force of gravity as well as to the drag force imposed by the upward flow of fluid to be metered. Associated with the flow tube is a position sensor which yields a control signal when the ball lies in a detection zone. The ball is also subjected to a magnetic force produced by an electromagnet energized by a current controller governed by the control signal, which force seeks to displace the ball away from the detection zone. The control signal causes the magnet current to pulse and the ball to oscillate in said tube at a frequency which is a function of flow rate, the frequency of the current being indicated to provide a flow rate reading.

9 Claims, 8 Drawing Figures

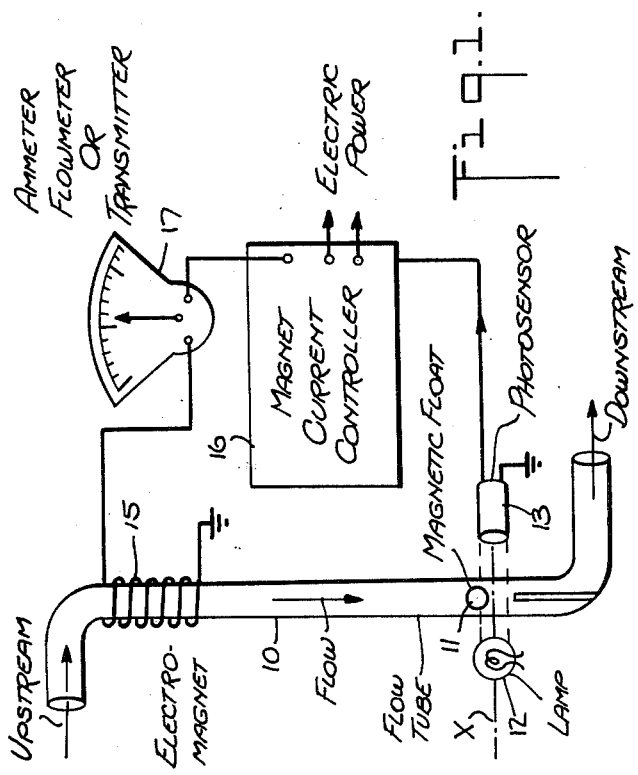
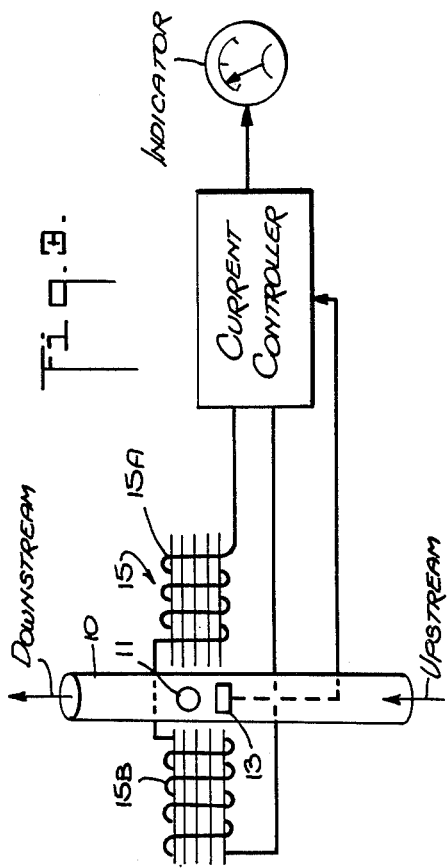
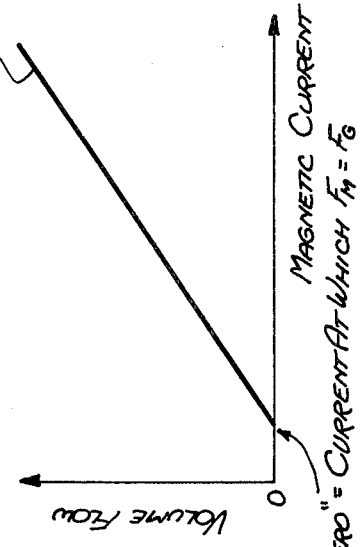
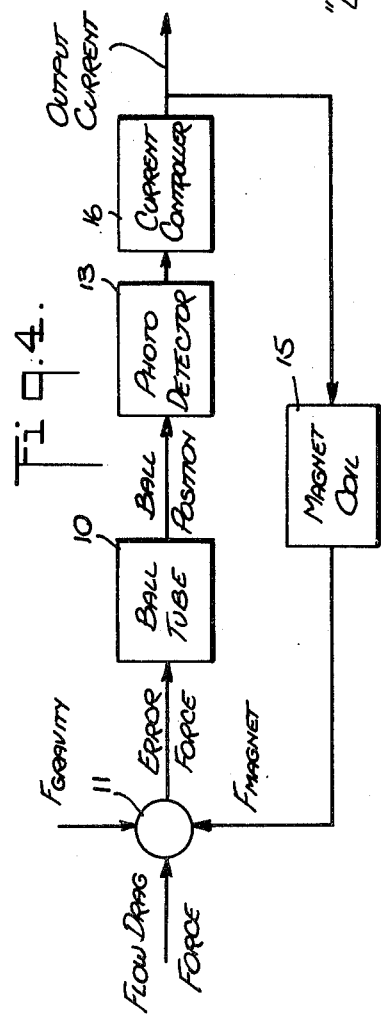

4,051,723

FORCE-TYPE FLOWMETER

RELATED APPLICATION

This application is a division of our copending application Ser. No. 626,832, filed Oct. 29, 1975, and having the same title.

BACKGROUND OF THE INVENTION

This invention relates generally to flowmeters adapted to measure the flow rate of fluids, and more particularly to a flowmeter capable of accurately measuring and transmitting exceptionally low flow rates.

In recent years the need for flowmeters and flow controllers for pilot plants and plants manufacturing such materials as pharmaceuticals and rare chemcials where extremely low flow rates are encountered has aroused considerable interest. Inasmuch as the present invention provides a flowmeter which satisfies this requirement, by way of introduction, we shall briefly review those types of flowmeters which are commonly used for measuring relatively low flow rate and indicate why these meters fail to accurately measure and transmit extremely low rates of flow.

One well-known class of flowmeters is the so-called head meter, which functions by measuring the pressure differential or "head" across a suitable restriction to flow in a pipe conducting the fluid to be metered. This pressure differential may be created by an orifice plate, a Venturi restriction, a capillary tube or other form of primary. Head meters are operable over a wide range of flow rates, from Venturi-type meters handling millions of gallons per hour to meters of the capillary type adapted to measure a few c.c. of liquid per hour.

The pressure differential developed across the primary of a head meter is measured by pressure-responsive secondaries having deflectable metal diaphragms. Such meters suffer from inaccuracies which become particularly troublesome at very low flow rates due to hysteresis in the deflection-versus-differential pressure characteristics inherent in metal diaphragms.

Moreover, response time may extend to minutes or hours when the flow rate is so low that is is only capable of satisfying the volume displacement of the diaphragm in minutes or hours. Capillaries foul easily, or if made so large as to prevent fouling, it may be hours before fluid entering one end emerges at the other.

In the area-type flowmeter, as distinguished from the head meter, one finds a variable orifice and a substantially constant pressure drop, rather than a fixed orifice and a varying pressure drop as a function of flow rate. In the area meter, flow rate is reflected by the changing area of the annular opening through which fluid must pass.

In a standard variable area flowmeter such as that disclosed in the Dettmer U.S. Pat. No. 3,712,134, the vertical tube through which the fluid is conducted in the upward direction is provided with a tapered bore affording a variable cross-sectional area. A weighted float or dragbody disposed in the bore is caused to assume a vertical position representing a condition of equilibrium between the downward gravitational force on the float and the upward force of the fluid flowing past the float through the annular orifice which surrounds it. This position of equilibrium is therefore a function of flow rate—the greater the flow rate, the higher the vertical position of the float.

Variable-area flowmeters cannot, as a practical matter, be used at extremely low flow rates except as a visual indicator without transmission. In order to transmit the position of the light-weight drag body or float, it is usually necessary to attach a long extension rod thereto which is coupled to a magnetic follower or other means to convert the vertical position of the float into a corresponding signal. Because of friction as well as magnetic and other forces which load the float, large errors in drag are experienced that distort the relationship between flow rate and float position and thereby give rise to inaccurate readings. Indeed, at extremely low flow rates, because of friction in the associated position-transmitter, the float is likely to stick so that no reading at all is obtained.

Thus standard flowmeters of the head or variable-area type are incapable of providing accurate measurement with signal transmission at extremely low flow rates. One approach heretofore taken toward accurately measuring extremely low flow rate is that disclosed in the Spencer, U.S. Pat. No. 3,662,598. In Spencer, a ferromagnetic ball positioned within a flow tube is shifted therein in the direction of fluid flow and is returned to its original position by actuating a magnetic return system when the ball intercepts a light beam. This forward and back cycle of ball motion is repeated. The transit time of the ball or its oscillatory frequency is a function of flow rate, thereby serving to indicate flow rate.

In the Spencer instrument, there is no mechanical link between the ball and a secondary, as in the case of a variable-area flowmeter coupled to a transmitter, and the area of the flow tube is uniform throughout its length. Inasmuch as the present invention also makes use of a constant area flow tube in conjunction with a ferromagnetic ball, the Spencer instrument as well as force-type flowmeters in accordance with the present invention will hereafter be referred to as a constant area-ball type flowmeter or by its acronum, CAB.

In a CAB meter of the Spencer type, the flow tube is maintained in a horizontal position; hence there is no gravitational component included in the vectors which determine the ball position, for only magnetic and fluid drag forces act on the ball. Thus when there is an absence of flow or an extremely low flow rate, the ball rests on the lower surface of the glass or plastic flow tube and some degree of friction is encountered which affects the accuracy of the instrument. Any accidental small departure from a truly horizontal position may introduce unwanted gravitational forces of large and random magnitude and direction with respect to the flow direction, causing large zero shifts. Moreover, since the CAB meter of the Spencer type employs a magnet whose force is always horizontal and opposed to the flow direction, this meter is incapable of sensing less than a minimum flow imposed by friction or by small residual magnetism, and cannot detect reversed flow. In other words, it cannot have a live zero.

SUMMARY OF INVENTION

In view of the foregoing, it is the main object of the present invention to provide an efficient and low cost flowmeter of the CAB type capable of measuring and transmitting extremely low flow rates.

More specifically, it is an object of the present invention to provide a transmitting flowmeter of the above-type wherein a ferromagnetic ball contained within a flow tube having a constant area is subjected to magnetic, gravitational and fluid drag forces to generate a signal which reflects the flow rate and which may be transmitted to a remote station to effect automatic process control functions.

Also an object of the invention is to provide a flowmeter which is capable of bi-directional operation.

A significant feature of the invention is that the CAB flowmeter is capable of measuring extremely low flows of gases as well as liquids.

Briefly stated, these objects are attained in a flowmeter provided with a vertically-positioned flow tube through which the fluid to be metered is conducted, the tube having a ferromagnetic ball therein which is subjected to the force of gravity as well as the drag force imposed by the fluid. Associated with the flow tube is a position sensor, typically constituted by a light source projecting a beam across the tube that is intercepted by a photosensor, the photosensor yielding a control signal when the ball lies within and obscures the beam.

The ball is also subjected to a magnetic force produced by an electromagnet energized by a current controller governed by the control signal, this force striving to displace the ball upwardly in the tube away from the light beam. Thus the ball functions as a force summing junction and is caused to assume a position depending on the vector resultant of the co-acting drag, gravitational and magnetic forces. The current generated by the controller is a function of the flow rate and is indicated to afford a flow rate reading.

OUTLINE OF DRAWINGS

For a better understanding of the invention as well as other objects and further features thereof, reference is made to the following detailed description to be read in conjunction with the accompanying drawings, wherein:

FIG. 1 is a schematic representation of a first embodiment of a flowmeter in accordance with the invention;

FIG. 2 is a graph showing the behavior of the flowmeter;

FIG. 3 is a schematic showing of a second embodiment of the invention;

FIG. 4 is a block diagram illustrating the forces co-acting on the ball which functions as a summing junction;

DESCRIPTION OF INVENTION

First Embodiment

Figure 5:
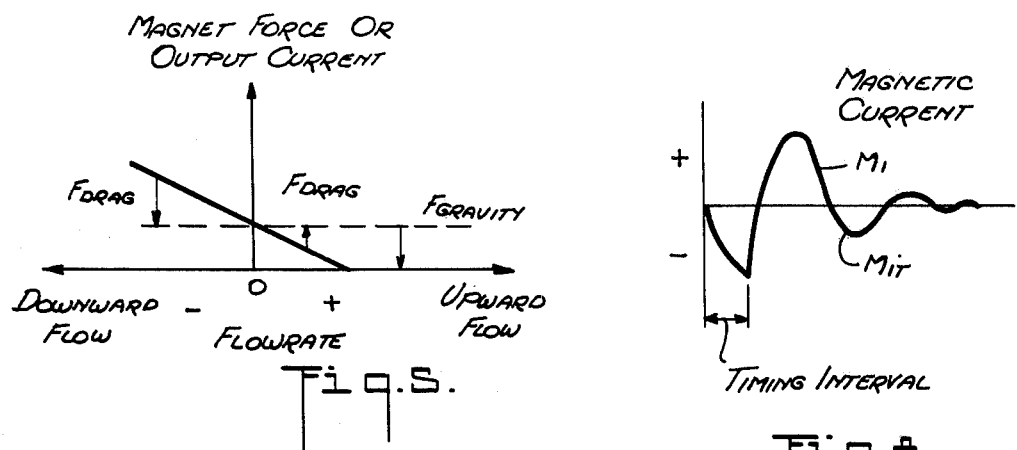
FIG. 5 is a graph showing the forces co-acting on the ball.

Referring now to FIG. 1, there is shown a first embodiment of a CAB type flowmeter in accordance with the invention. The fluid to be metered is conducted through a flow path having a vertically-positioned flow tube 10 whose cross-sectional area is uniform throughout its length. The direction of flow in flow tube 10 is in a downward path, hence the downstream direction in tube 15 is downward. The flow tube is formed of glass or transparent plastic material, boro-silicate glass being preferred.

Received within flow tube 10 is a ball or sphere 11 which has ferromagnetic characteristics and is therefore responsive to a magnetic force. The diameter of the ball is smaller than that of flow tube 10, so that the ball is free to move therein. In practice, the ball may be a hollow, soft iron sphere having a protective coating thereon, or it may be formed of a light-weight plastic body having iron filings dispersed therein. Alternately, the ball may take the form of a solid plastic or glass body having an iron core embedded centrally therein, or the ball may be solid and of a heavy metal such as a magnetic stainless steel of low retentivity.

Mounted adjacent the lower end of flow tube 10 is a position sensor constituted by a collimated light source 12 whose rays are projected through tube 10 and are intercepted by a suitable photosensor 13 disposed on the opposite side of the flow tube. The amount of light received by the photosensor reaches its maximum level when ball 11 is above the intersecting light beam and attains its minimum level when the center of ball 11 is intersected by transverse optical axis X extending between the light source and the photosensor, whereby the beam is then almost fully obstructed. A stop 14 is mounted in the flow tube to prevent the ball from moving below the light beam.

Surrounding the upper end of flow tube 10 is an electromagnet 15 whose coil is energized by current generated in a voltage-responsive magnet current controller 16. The output of controller 16 is fed to the excitation coil of the electromagnet through an ammeter 17 which is calibrated to indicate flow rate. The current passing through the ammeter, being a function of flow rate, may be used as a control signal and transmitted to effect automatic process control operations in the usual manner.

The current supplied to electromagnet 15 is modulated as a function of the voltage applied to the input of controller 16 by photosensor 13; the greater the voltage, the stronger the magnet current. It will be appreciated that the light sensor detects variations in the position of the ball within a narrow range, for once the ball is displaced above the beam of light, it ceases to more or less obscure the beam and therefore has no influence on the output voltage of the photosensor.

When fluid flows downwardly in the flow tube, the ball is subjected to three components of force, the position assumed by the ball being the vector resultant of these components. The first component is the drag force acting on the ball due to fluid flow, this component tending to push the ball downstream. The strength of the drag force component depends, of course, on flow rate. The second component is the constant force of gravity which acts on the ball to displace it also in the downstream direction. The counteracting third component is the magnetic force produced by the electromagnet which attracts the ferromagnetic ball and seeks to pull the ball upwardly in the upstream direction of the flow section.

In this first embodiment, the magnetic current is so regulated as to cause the ball to assume a substantially constant position regardless of the flow rate. The force of gravity component is constant, and as the drag force component varies with flow rate, the counteracting magnetic force is varied accordingly to maintain the ball at its equilibrium position.

The distance from the electromagnet to the light beam is sufficiently large so that the width of the beam and the even smaller variations of the controlled position of the ball are negligible. Consequently, the force of the magnetic component on the ball is directly proportional to the intensity of magnetic current required to establish the substantially constant ball position for a given flow rate. The magnetic current reading given by the ammeter is therefore an index of flow rate.

The magnetic current supplied by controller 16 is preferably d-c, although a-c may be used, in which latter event the frequency thereof must be high enough so that the resultant oscillation of the ball remains small compared to the width of the light beam.

It will now be apparent that the downwardly-imposed drag force F on the ball due to flow must remain equal to the difference between the upwardly-imposed magnetic force $F_M$ and the relatively small and constant downwardly-imposed force of gravity $F_g$ on the ball when it is immersed in a metered fluid of constant density. When there is no downward flow, the drag force is zero and the magnet current then necessary to support the ball against the force of gravity provides a "live zero" which is free of the hysteresis inherent in structural deflection elements of the type found in differential-pressure sensors employed in head meters.

Moreover, unlike a variable area meter whose minimum flow is necessarily greater than zero in that it is not possible to reduce the flow area between the tapered tube and float to zero, the present CAB meter provides for an "infinite range" (i.e., the ratio of the maximum to the minimum flow that can be sensed and measured). The force equation is:

DRAG FORCE $F = F_M - F_g$, where $F_g$ is the ball weight (or any component of ball weight if the flow section is inclined). The flow equation for turbulent flow is:

Mass rate $W = K_t D_f \sqrt{F\rho}$ where the turbulent coefficient $K_t$ is only slightly variable with the viscosity parameter.

Viscous influence number $N = \sqrt{F\rho/\mu}$ and varies predominantly with the $\alpha$, the ratio of the tube section diameter $D_t$ to the ball diameter $D_f$, alpha ratio $\alpha = D_t/D_f$ and where $\rho$ and $\mu$ are the fluid density and fluid viscosity.

The arrangement illustrated in FIG. 1 is particularly suitable for measuring very low or laminar flows where the various turbulent flow coefficients associated with various alpha ratios are no longer independent of the viscous influence number N but are directly proportional to N. Introducing a proportionality constant for each alpha, say $C(\alpha)$, viscous or laminar flow in any device sensing drag is given by the equation:

$K_t = C(\alpha) N = C(\alpha) \sqrt{F\rho/\mu}$ so that the mass rate becomes, $W = C(\alpha) N D_f \sqrt{F\rho}$ $W = C(\alpha) D_f \sqrt{F\rho/\mu} \cdot \sqrt{F\rho} = C(\alpha) (D_f F\rho/\mu)$ and the volumetric flow Q is given by dividing mass rate W by density $\rho$ to yield $Q = K_l D_f F/\mu$, where $K_l$ is now the constant laminar flow coefficient for any one alpha ratio. In the arrangement shown in FIG. 1, the tube and float diameters and hence the alpha ratio are constant, and so the flow versus magnet current is linear, as illustrated in FIG. 2.

Second Embodiment

In the first embodiment of the invention, the ball is maintained by magnetic force in a substantially fixed position, so that the magnet current which is a function of flow rate depends on the intensity of current required to attain this condition. In the second embodiment disclosed in FIG. 3, the arrangement is such as to cause the ball in the vertical flow tube 10 to oscillate at a rate which is a function of flow rate, the oscillatory frequency being indicated to afford a flow rate reading.

In the arrangement shown in FIG. 3, while flow tube 10, is shown as vertical, the section may be at an angle with respect to vertical as long as it has an upward component. The fluid to be metered flows upwardly in flow tube 10 so that upstream in this instance is toward the lower end of the flow tube and the force of the gravity component acting on ferromagnetic ball 11 urges the ball in the downstream direction. (This is the reverse of the relationship existing in the first embodiment.)

As in the case of the first embodiment, the position of the ball is sensed by a light source 12 and photosensor 13, only the photosensor being visible in FIG. 3. At zero fluid flow, electromagnet 15, which is energized by current generator 16, is triggered when the ball intercepts the light beam emitted by lamp 12, so that the resultant output of the photosensor actuates the generator, thereby causing the ball in response to the magnetic force to shift upwardly. When this happens, the beam path is restored and the generator de-activated to break the magnetic force acting on the ball which then drops toward the light beam. When the falling ball again intercepts the beam, the cycle is repeated. As a consequence, the ball is caused to oscillate back and forth between the light beam and a position thereabove. This ball frequency is indicated by frequency meter 18 which is calibrated in terms of flow rate.

The frequency $f_o$ of ball oscillation is dictated by a controlled impulse per pulse $I_p$ and the axial component of the buoyed ball weight $W_b$ in accordance with the following equation for zero fluid flow:

$f_o = W_b/I_p$

But with fluid flow, the ball is then subjected to a drag force $F_D$ which seeks to push the ball downstream, and as the flow increases, the frequency of oscillation decreases so that:

$f = (W_b - F_D)/I_p$

Combining equations and solving for the fluid flow drag:

$F_D = (f_o - f) I_p$

By designing electromagnet 15 and its associated circuit so that there is a constant value of impulse imparted to the ball by each triggering of the position sensor-magnet actuating arrangement, one is able to attain a decrease in the oscillatory frequency of the ball as the fluid flow rate rises above zero that is directly proportional to the drag force imposed on the ball.

In the case of very low Reynolds numbers, this change in the oscillatory frequency of the ball is proportional to the product of volume rate and dynamic viscosity, whereas for very high Reynolds numbers the frequency change would be proportional to the product of fluid density and the square of the volumetric flow rate. This relationship can be made applicable to intermediate Reynolds numbers by using drag bodies which are non-spherical. The term "ball" as used herein is intended to cover non-spherical as well as spherical bodies.

Electromagnet 15 in the second embodiment preferably takes the form of laminated iron pole pieces 15A and 15B at diametrically opposed positions on either side of flow tube 10, with characterized shaped to minimize the dependence of the impulse per pulse. The position sensor formed by the light source and photosensor 13 is disposed so that the light beam is directed through the tube at right angles to the magnetic lines of flux. In this arrangement, ball 11 never falls below the light beam to hit a lower float stop, except when flow is zero and the electric power supply is turned off. The circuit may include an arrangement for triggering a series of magnet pulses at a frequency that is very low compared to the lowest value of "f" to be used at highest flow rate to be measured. When power is turned on, one of these pulses raises the ball to its operating oscillatory position. This "start" triggering is disabled when any higher frequency is generated in normal operation. When the flow exceeds the maximum to be measured, the fluid drag is sufficient to raise the ball above the magnet to an upper or downstream float stop so that oscillation stops. The absence of a frequency representing normal operation re-enables the "start" circuit, so that the very low frequency of this circuit produces an "overrange" signal, which may actuate an alarm, and which is sustained until flow is again reduced to the operating range, when the pressue of a frequency in the normal range again disables the "start" circuit.

The oscillatory ball arrangement shown in FIG. 3 provides the following advantages:

1. The meter is self-starting when power is turned on, regardless of the presence of flow or not flow, or after over-range.
2. A positive over-range signal is produced when there is no oscillatory ball frequency and an uninterrupted light beam.
3. Live zero (infinite range).
4. The span is independent of accidental deviations of several degrees of the flow tube from the vertical.
5. The oscillatory ball flowmeter is practical for gas flow measurement as well as liquid.

The main distinctions between the first and second embodiments resides in the following: In the first embodiment, the drag force component is downward, whereas in the second embodiment it is upward. In the first embodiment the governed magnet current is continuous to provide an analog value which is a function of flow rate, whereas in the second embodiment the governed magnet current is periodic to provide a digital value indicative of flow rate.

The pulsed magnet current has the advantage of producing a "dither" ball action which minimizes possible sticking of the ball to the glass wall of the flow tube, the dither also enhancing the hydraulic characteristics by breaking up possible local air pockets and reducing ball instability that may be encountered around a stationary body. Moreover, a digital readout lends itself better to effective signal transmission and totalization.

FIG. 4 demonstrates why ball 11 in the first and second embodiments of the invention acts as a summing junction, for it will be seen that the ball is subjected to a downward (−) force of gravity, an upward (+) magnetic force and a drag force which, in the case of the second embodiment, is normally upward (+) and in the first embodiment is normally downward (−). Controller current 16, which is governed by photosensor 13 in accordance with the ball position, produces a current which reflects the vector resultant of these forces and thereby provides a signal indicative of flow rate.

In either the first or second embodiments, a reversal of the flow will reverse the drag force, so that a live zero and bi-directional flow sensing are achieved.

As illustrated graphically in FIG. 5, a magnet force or output current exists at zero flow to provide an output, this output decreasing with increasing upward flow and increasing with downward flow. The upward flow limit is reached when the flow-drag exceeds the maximum design force of the magnet.

Figure 6:
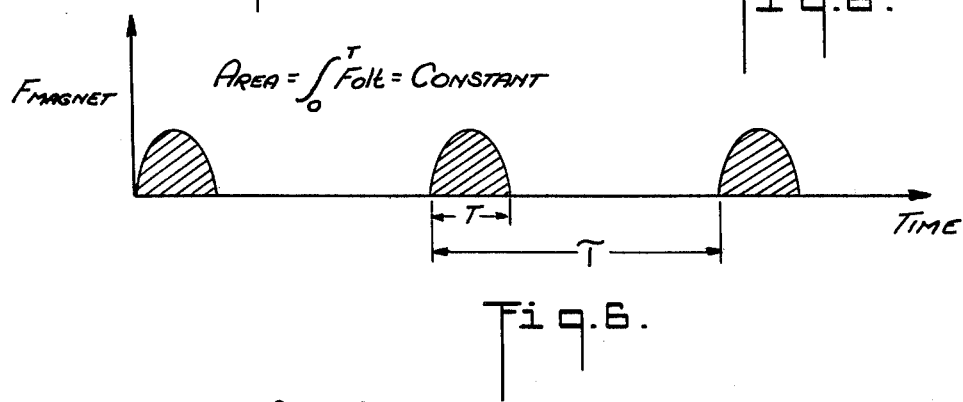
FIG. 6 is a wave form of the pulsatory output of the second embodiment of the flowmeter.

The excitation current supplied to the magnet may be either continuous (first embodiment) or pulsed (second embodiment). In the pulsed mode, the current controller and the magnet structure are designed such that each current pulse produces a fixed impulse on the ball. Since impluse is the time integral of the applied force as depicted in FIG. 6, the average force is given by:

$$\overline{F}_{magnet} = (\int o\ TF_{magnet}\ dt/\tau = \text{Impulse per pulse}/\tau = I_p \cdot f$$

The average force is therefore inversely proportional to the period of current pulses applied (assuming the current pulse area is constant) or directly proportional to the frequency.

Third Embodiment

Figure 7:
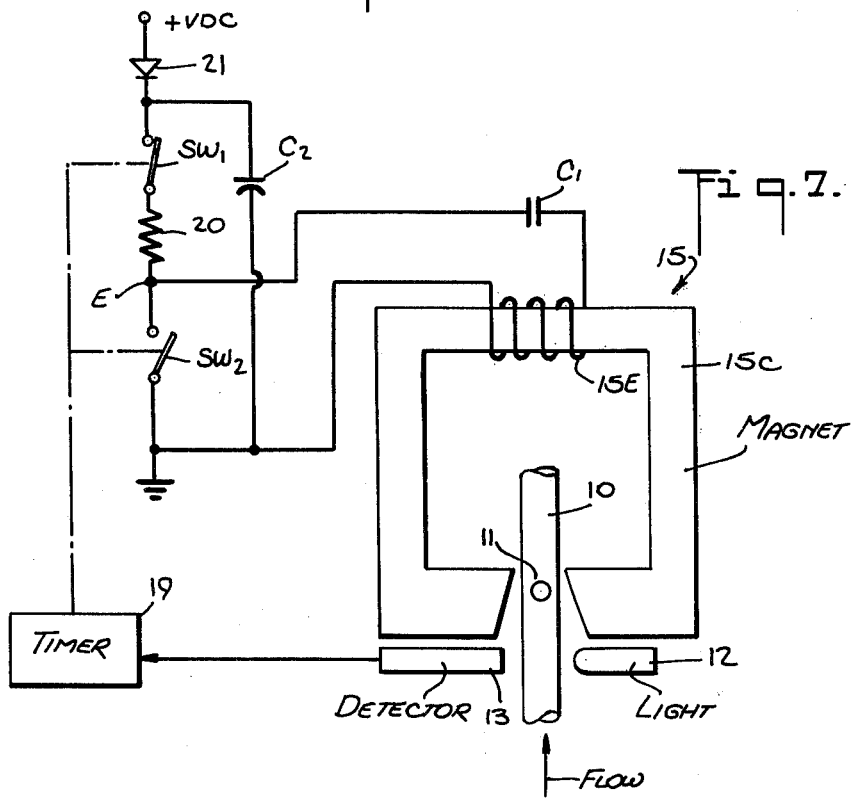
FIG. 7 is a schematic circuit diagram of a third embodiment of the invention.

This embodiment, which is shown in FIG. 7, as in the case of the second embodiment, also provides a pulsatory output and includes a flow tube 10 and a position sensor for ball 11, constituted by a light source 12 and a photosensor 13 which detects the ball when it enters the detection zone defined in the tube by the light beam. Electromagnet 15, in this instance, is formed by a horseshoe-shaped iron core 15C, whose poles are disposed on opposite sides of tube 10, the core having an excitation coil 15E would thereon to establish a magnetic field whose lines of flux extend across the tube. In practice, iron core 15C may take the form of a hinged two-piece structure, making it possible to adjust the air gap between the poles to accommodate flow tubes of different size.

The output of photosensor 13 governs the action of an electronic timer 19. When ball 11 is detected, the operation of the timer is initiated. Timer 19 then acts to open a switch $SW_1$ and to simultaneously close a switch $SW_2$. These switches are connected in series with a resistor 20, the series circuit having a fixed D-C voltage applied thereacross between ground and the positive terminal (+VDC) through a diode 21.

Magnet coil 15E is connected between ground (the negative terminal) and a capacitor $C_1$ to a voltage point E at the junction of resistor 20 and switch $SW_2$. A second capacitor $C_2$ is connected between ground and the junction of switch $SW_1$ and diode 21. When the timer acts to close switch $SW_2$ and open switch $SW_1$, voltage point E is then grounded through closed switch $SW_2$, and current then proceeds to flow through capacitor $C_1$ in the magnet coil circuit, thereby energizing electromagnet 15. This produces a magnetic force which acts to lift ferromagnetic ball 11 upwardly in tube 10 against the force of gravity. This lifting action is aided by the drag force of the fluid being metered. Capacitor $C_2$, connected across the series circuit formed by switches $SW_1$, $SW_2$ and resistor 20, acts as a storage device.

Figure 8:
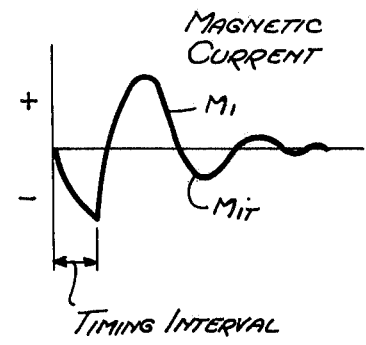
FIG. 8 is the wave form of the magnet current produced in the third embodiment.

Timer 19 is set for a few milliseconds and at the end of its timing interval T (see graph in FIG. 8), it acts to close switch $SW_1$ and simultaneously open switch $SW_2$ (the reverse of its previous action), as a result of which the voltage at point E proceeds to build up and overshoot. The voltage at E cannot return to the power supply terminal +VDC, for it is blocked from doing so by the unidirectional diode 21. Ball 11 therefore continues to rise in tube 10 as the magnet current $M_i$ continues to flow. After the voltage at point E attains its peak value, the voltage then proceeds to drop and current in magnet 15 reverses, as a result of which a ringing or damped a-c cycle is initiated, as indicated by $M_{ir}$ in FIG. 8, with a gradual decay of magnet current.

As long as current flows in magnet coil 15E, the ball is subject to a magnetic force. The ringing period is determined by resistor 20, which acts as a damping resistance. The a-c current flow during the ringing period and the slow decay thereof acts to demagnetize the ball, as a result of which the ball is freed of any unwanted residual traces of "permanent magnet" polarity which, without the decaying ringing current, would be found in all practical magnetically soft ball material, for which ideal of zero magnetic retentivity is achieved in practice. Thus the decayed ringing characteristic eliminates drifts in the value of the impulse per pulse $I_p$ which might otherwise alter the calibration.

At the end of the magnetic cycle, the ball decelerates and drops back in the tube in the upstream direction against the flow drag force, until the ball again enters the detection zone and intercepts the light beam of the position sensor, thereby initiating the next operating cycle which causes the ball to rise.

Assuming a fixed energy transfer for each magnetic pulse force applied to the ball, and further assuming that the ball is a force integrator or summing junction, it will be evident that at zero flow, the product of the pulse frequency times the impulse per pulse is equal to the weight of the ball, whereas when fluid flow exists, the product of the pulse frequency times the impulse per pulse is equal to the weight of the ball minus the drag force thereon, for this drag force partially supports the ball. Consequently, the change in pulse frequency is proportional to the drag force which is a function of flow rate. This frequency is measured to indicate flow rate.

While there have been shown and described preferred embodiments of a CAB-type flowmeter in accordance with the inventon, it will be appreciated that many changes and modifications may be made therein without, however, departing from the essential spirit thereof. For example, in lieu of an optical position sensor using a light transmission arrangement as shown, one may use a reflective arrangement. Or the position of the ball may be detected by an ultrasonic sensor or by a high-frequency permeability sensor. Alternatively, the ball position may be detected sonically by a microphone embedded in a stop positioned in the flow tube to be struck by the ball.

We claim:

1. A flowmeter capable of accurately measuring extremely low flow rates, said flowmeter comprising: A. a flow tube through which the fluid to be metered is conducted in the upward direction; B. a ferromagnetic ball disposed in said flow tube and movable therein, said tube having an upward inclination whereby said ball is subjected to the force of gravity, and in the absence of any other force, tends to fall down said tube; C. a position sensor operatively associated with a detection zone in said tube adjacent the low end thereof to provide a control signal when the ball lies within said zone; D. an electromagnet associated with said tube adjacent the high end thereof to provide, when energized, a magnetic force attracting said ball and seeking to raise it above said detection zone; E. a current controller coupled to said electromagnet to energize same, said controller being governed by the control signal from said position sensor and generating a magnet current to energize said electromagnet, said position sensor producing a control signal which causes said magnet current to pulse and said ball to oscillate at a rate depending on the flow rate of the fluid; and F. means indicating the frequency of said current to provide a reading of flow rate.

2. A flowmeter as set forth in claim 1, wherein said electromagnet is formed by a pair of electromagnetic pole sections disposed on opposing sides of the tube, each section having a laminated iron core and a coil wound thereon.

3. A flowmeter as set forth in claim 1, wherein said electromagnet is formed by a horseshoe-shaped core whose poles define an air gap are disposed on opposite sides of said flow tube, and a coil wound about the core.

4. A flowmeter as set forth in claim 1, wherein said tube is translucent and said sensor includes a photodetector arranged to sense a light beam passing through said tube and intercepted by said ball in said detection zone.

5. A flowmeter as set forth in claim 1, wherein said sensor includes a photodetector arranged to sense the reflection of a light beam from said ball in said detection zone.

6. A flowmeter as set forth in claim 1, wherein said ball is constituted by a plastic sphere incorporating a soft iron element.

7. A flowmeter as set forth in claim 1, wherein said controller includes a capacitor connected in series with said coil and a source of direct current, and a switch responsive to the control signal from the sensor to cause the capacitor to charge to produce said magnet current, said capacitor and coil forming a ringing circuit to demagnetize the ball.

8. A flowmeter as set forth in claim 1, wherein said tube is vertically-oriented.

9. A flowmeter as set forth in claim 3, wherein the poles are shaped to provide in said air gap a substantially uniform magnetic field in the region within which the ball oscillates.

* * * * *

UNITED STATES PATENT AND TRADEMARK OFFICE
CERTIFICATE OF CORRECTION

PATENT NO. : 4,051,723
DATED : October 4, 1977
INVENTOR(S) : Victor P. Head and Peter J. Herzl It is certified that error appears in the above-identified patent and that said Letters Patent are hereby corrected as shown below:

Column 1, line 16 "chemcials" should have read -- chemicals --

Column 2, line 39 "acronum" should have read -- acronym --

Column 7, line 19 "shaped" should have read -- shapes --

Column 7, line 42 "pressue" should have read -- pressure --

Column 8, line 31 "impluse" should have read -- impulse --

Column 8, line 51 "would" should have read -- wound --

Signed and Sealed this

Seventh Day of February 1978

[SEAL]

Attest:

RUTH C. MASON
*Attesting Officer*

LUTRELLE F. PARKER
*Acting Commissioner of Patents and Trademarks*